E. GOLD.
HEATING SYSTEM.
APPLICATION FILED FEB. 15, 1910.
1,087,164.
Patented Feb. 17, 1914.
9 SHEETS—SHEET 1.
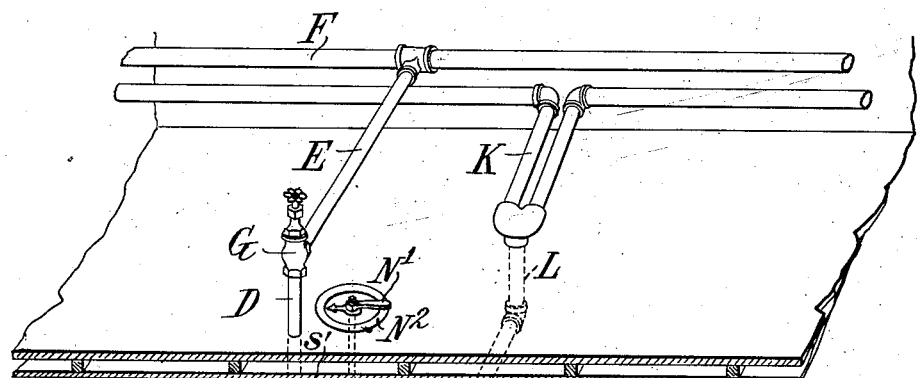
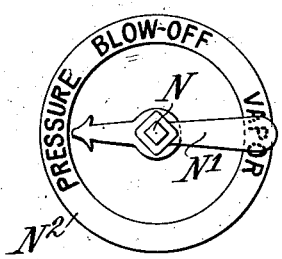
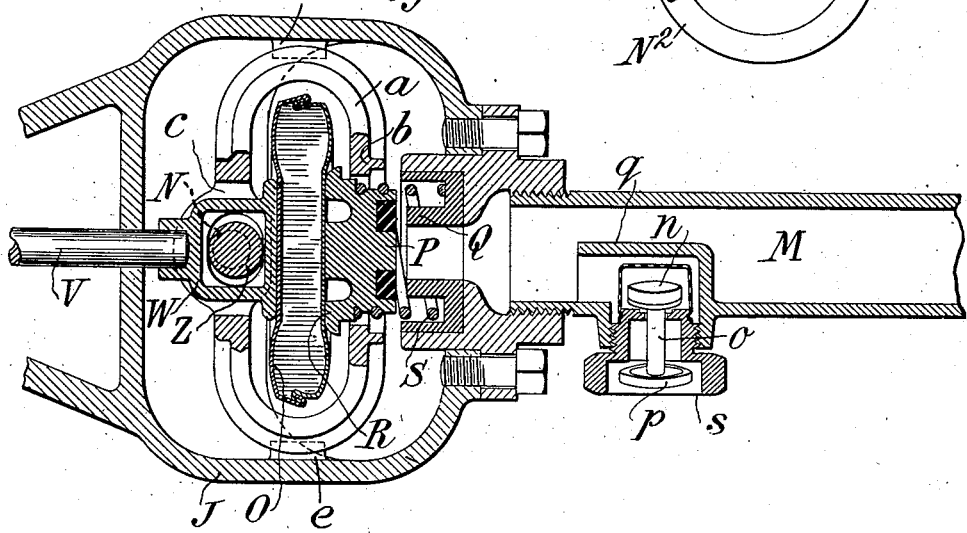
WITNESSES:
INVENTOR:
Edward E. Gold,
By Attorneys

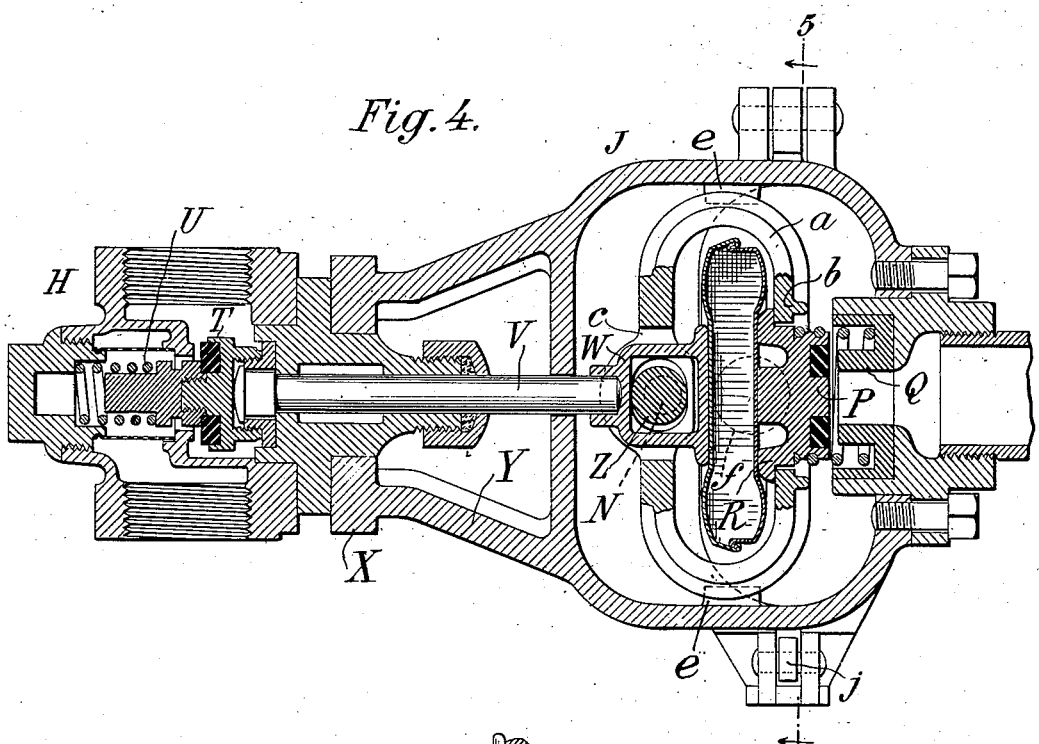
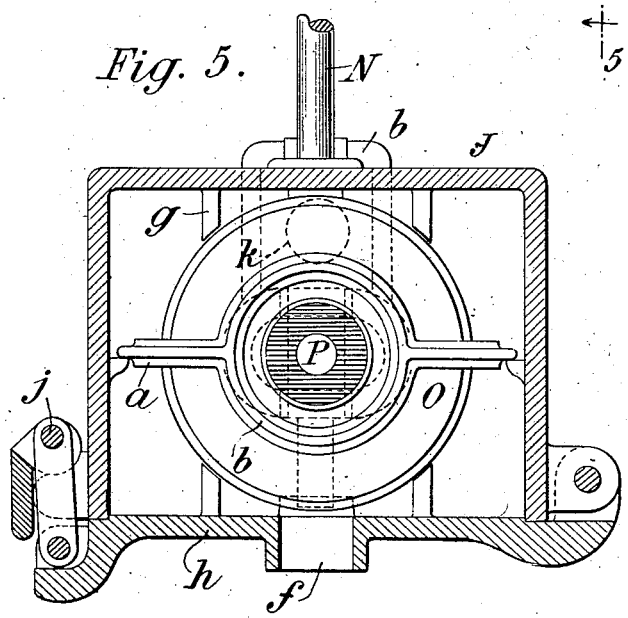

INVENTOR:
Edward E. Gold,
By Attorneys,

E. E. GOLD.
HEATING SYSTEM.
APPLICATION FILED FEB. 15, 1910.
1,087,164.
Patented Feb. 17, 1914.
9 SHEETS—SHEET 4.
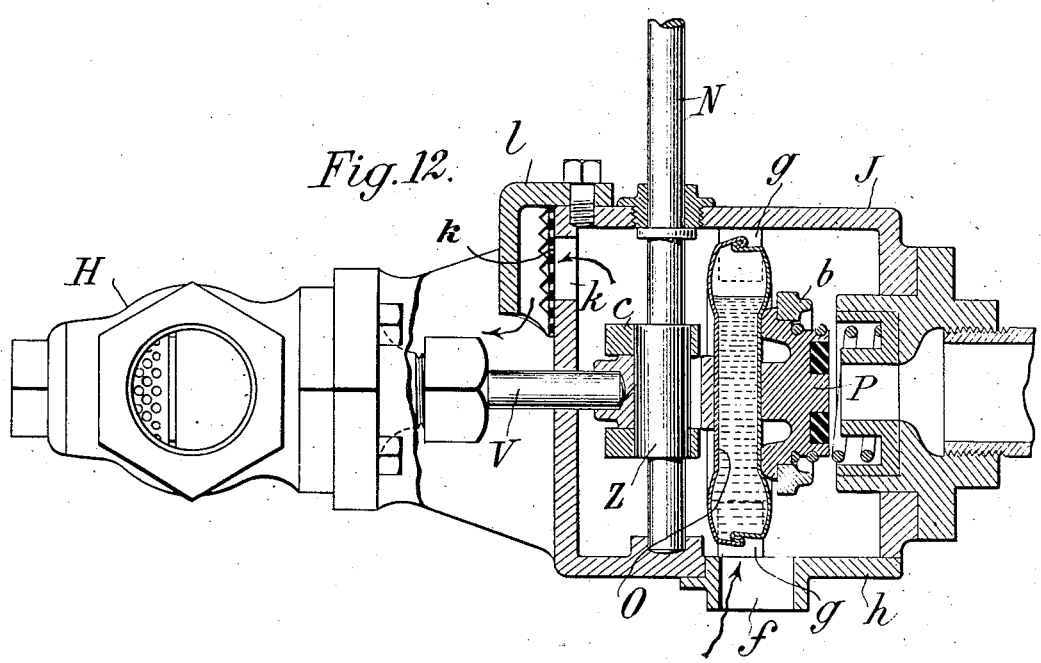
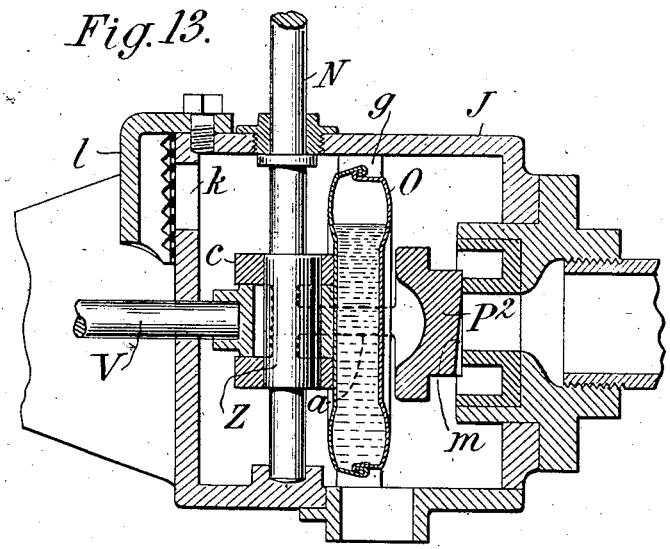
WITNESSES:
Fred White
Rene Bruine
INVENTOR:
Edward E. Gold,
By Attorneys E. E. GOLD.
HEATING SYSTEM.
APPLICATION FILED FEB. 15, 1910.
1,087,164.
Patented Feb. 17, 1914.
9 SHEETS—SHEET 5.
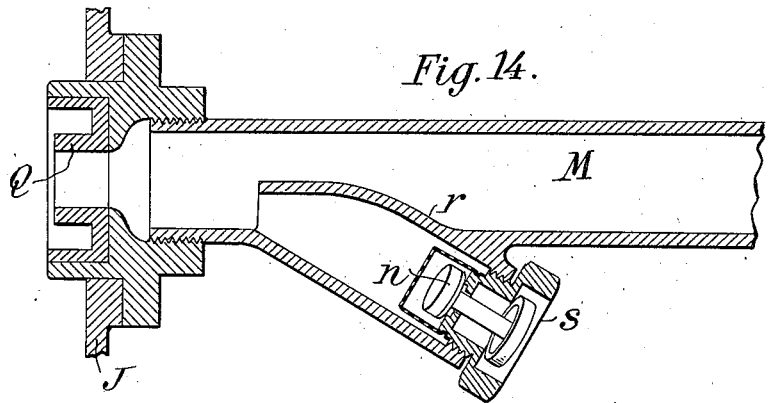
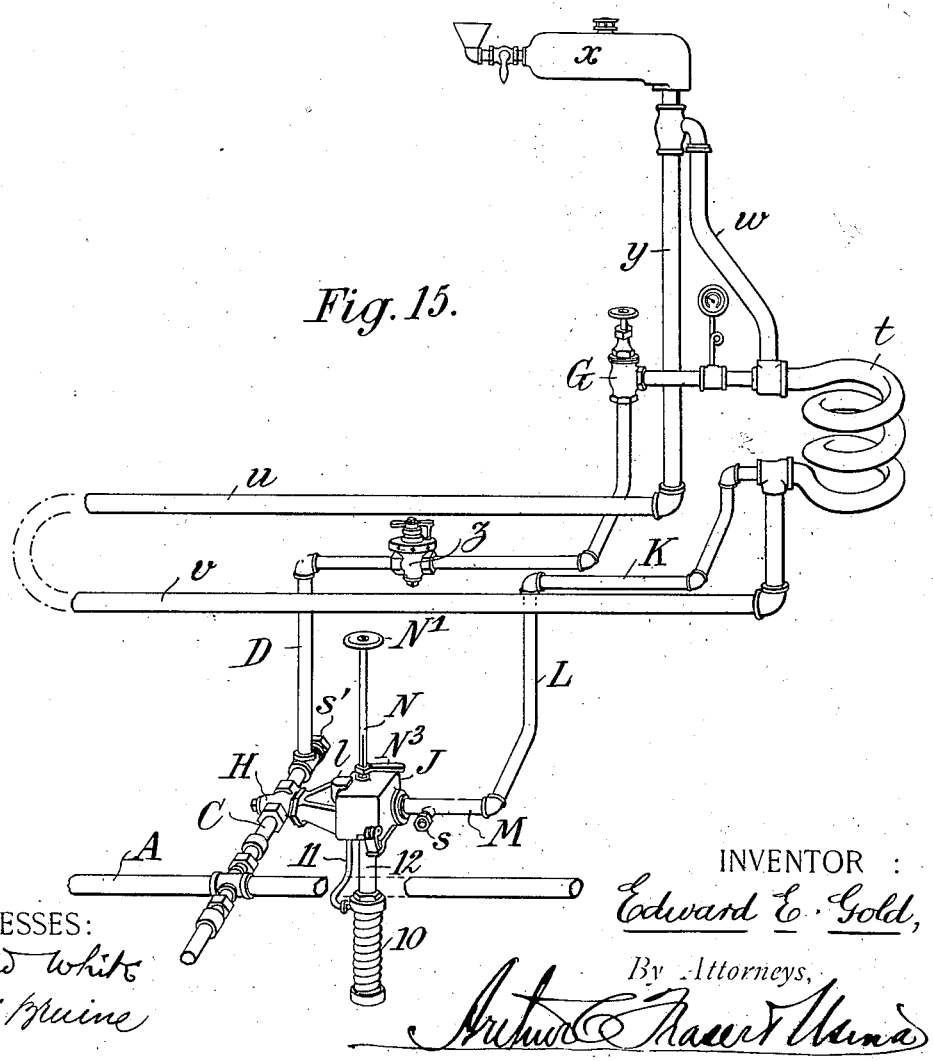
WITNESSES:
INVENTOR:
Edward E. Gold,
By Attorneys,

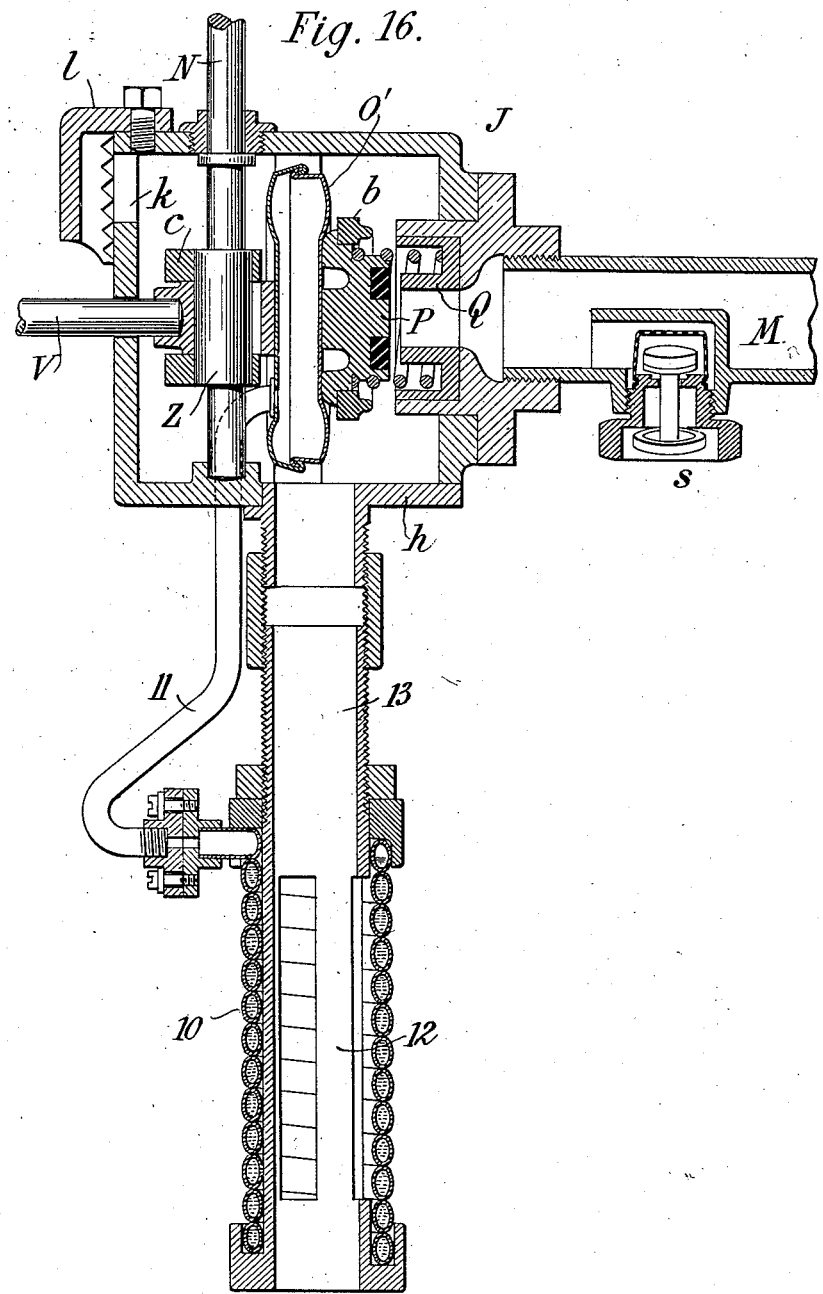

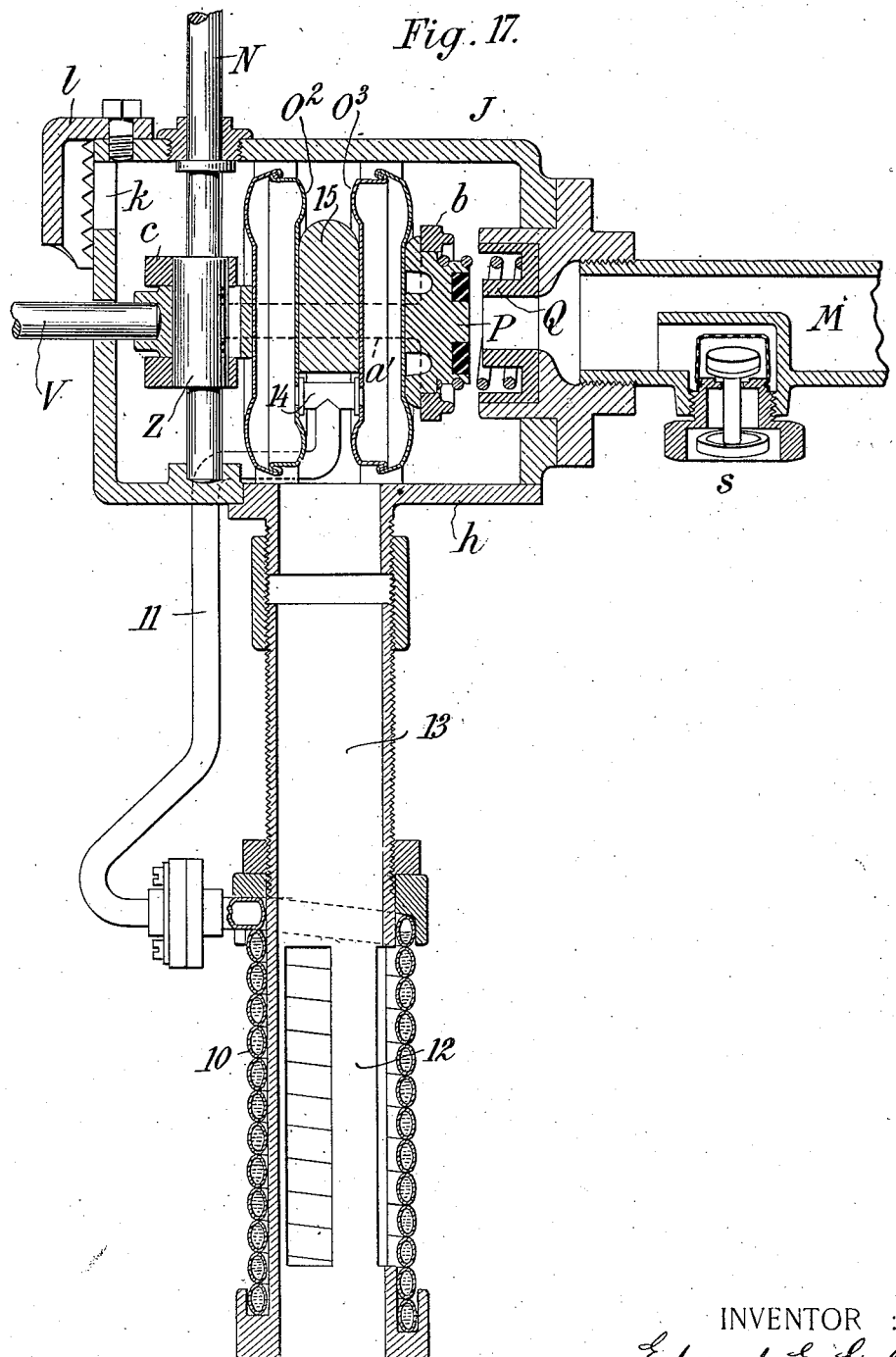

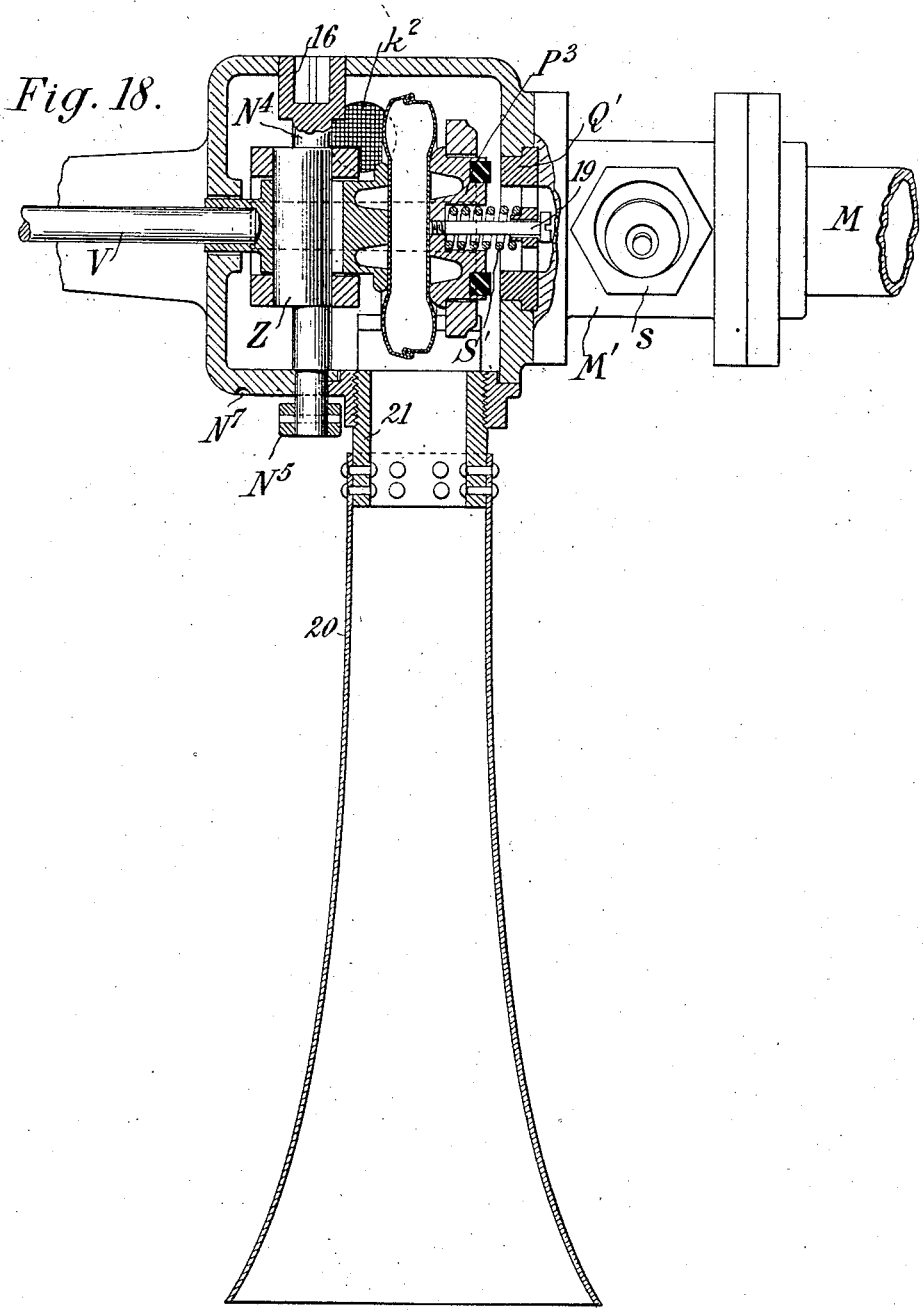

E. E. GOLD.
HEATING SYSTEM.
APPLICATION FILED FEB. 15, 1910.

1,087,164.

Patented Feb. 17, 1914.

9 SHEETS—SHEET 9.

WITNESSES:
Fred White
René Bruine

INVENTOR:
Edward E. Gold,
By Attorneys,
Arthur E. Chaser & Usina

UNITED STATES PATENT OFFICE.

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK.

HEATING SYSTEM.

1,087,164.  Specification of Letters Patent.  Patented Feb. 17, 1914.

Application filed February 15, 1910. Serial No. 544,028.

*To all whom it may concern:*

Be it known that I, EDWARD E. GOLD, a citizen of the United States, residing in the borough of Manhattan, city, county, and State of New York, have invented certain new and useful Improvements in Heating Systems, of which the following is a specification.

In my application for patent for an improvement in thermostatic mechanism, No. 532,369 (Patent No. 1,077,224), I have described a steam heating system for railway cars of the interchangeable type; that is to say, which may be arranged to work automatically as a pressure system utilizing the pressure of a train-pipe or other source of steam under pressure, or as a vapor system using the steam at approximately atmospheric or lower pressure. The present application is based chiefly upon the same system and apparatus. It will be understood, however, that the apparatus is applicable to other fields than the heating of railway cars, and that it contains features and combinations which are separately valuable as hereinafter claimed.

This invention is applicable to direct or indirect radiating systems, and the term "radiator" is applied to the steam pipes whether their heat is radiated directly into the atmosphere to be warmed or through the intermediation of a body of water surrounding them, or otherwise. The admission and exhaust valves may be normally either open or shut, and may assume their normal positions under the influence of steam pressure, or a spring or weight.

The accompanying drawings illustrate embodiments of the invention.

Figure 6:
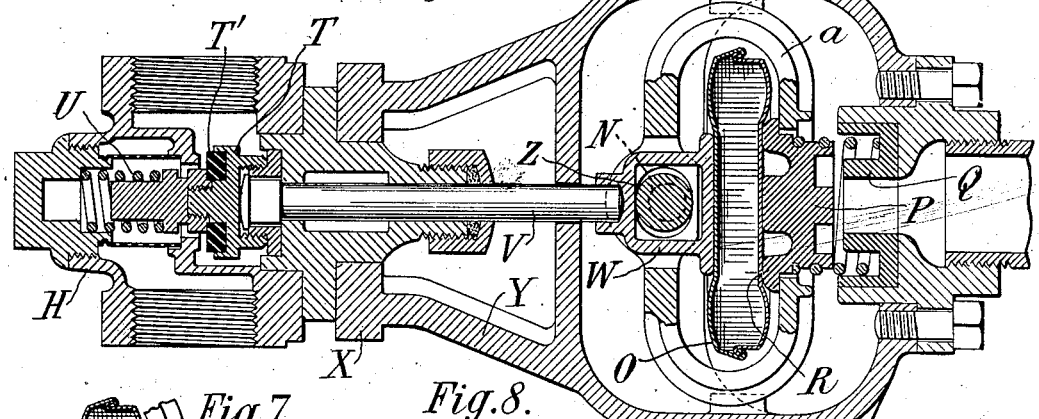
Figure 7:
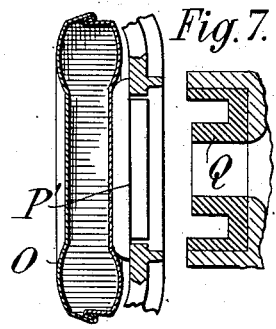
Figure 8:
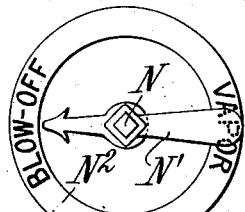
Figure 9:
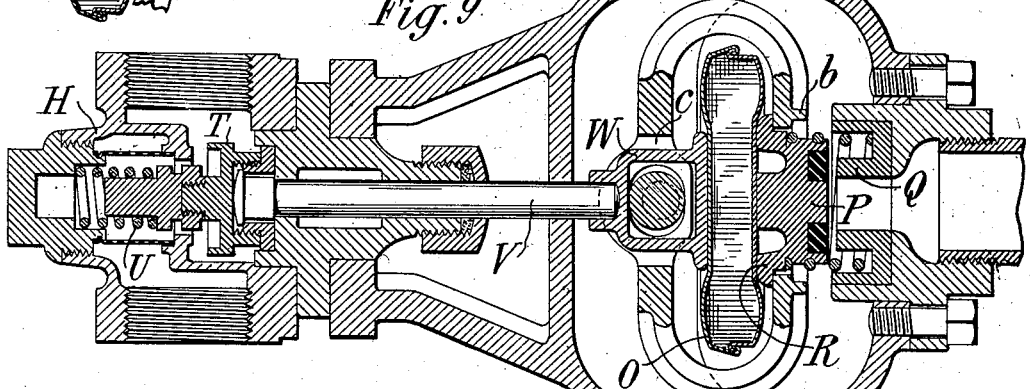
Figure 10:
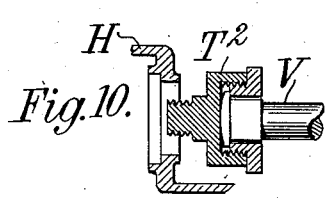
Figure 11:
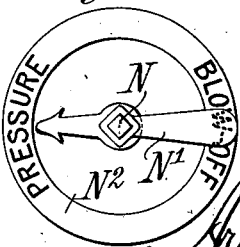
Figure 19:
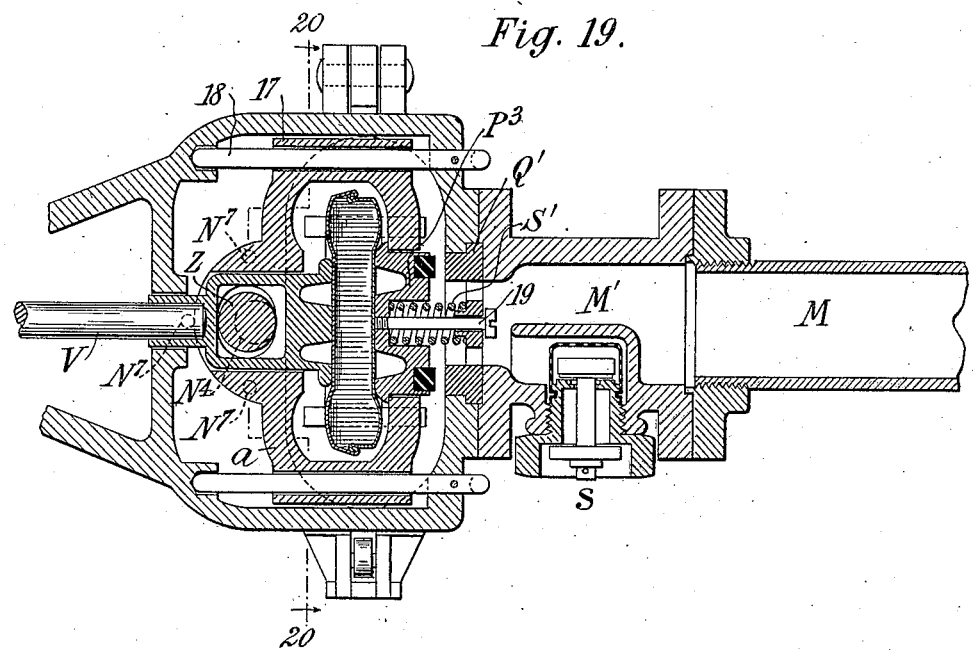
Figure 20:
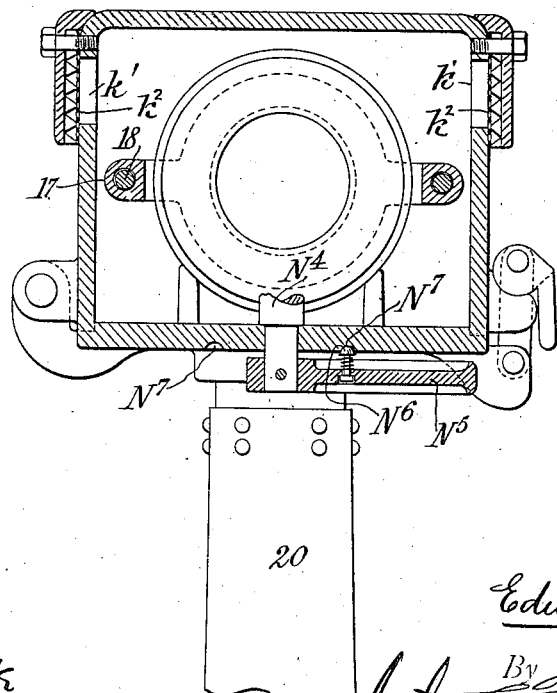

Figure 1 is a perspective of the principal parts of the system applied to the heating of a railway car. Fig. 2 is a plan of an adjusting handle set in the floor of the car. Fig. 3 is a horizontal section through the thermostatic device and adjacent parts, the system being adjusted for pressure operation. Fig. 4 is a similar view, the system being adjusted for vapor operation. Fig. 5 is a section approximately on the line 5—5 of Fig. 4. Fig. 6 is a view similar to Fig. 4 with the discharge valve rendered useless so as to convert the system from an interchangeable one into one which is solely a vapor system. Fig. 7 is a horizontal section illustrating a modified detail serving the same purpose. Fig. 8 is a plan of the adjusting handle for the apparatus of Figs. 6 and 7. Fig. 9 is a similar view to Fig. 6 showing the admission valve rendered inoperative so as to convert the system from an interchangeable one into one which operates solely as a pressure system. Fig. 10 is a horizontal section of a modified detail for effecting the same result. Fig. 11 is a plan of the floor plate and handle for such a modified construction. Fig. 12 is a vertical sectional view through the thermostat and valves. Fig. 13 is a similar view showing the substitution of a drip valve for the automatic discharge trap of Fig. 12. Fig. 14 is a horizontal section through the discharge pipe showing another arrangement of the gravity trap. Fig. 15 is a view similar to Fig. 1 showing the application of the invention to an indirect heating system. Fig. 16 is a vertical sectional view similar to Fig. 12 but showing a variant of the thermostat. Fig. 17 is a similar sectional view showing another variant of the thermostat. Figs. 18, 19 and 20 are respectively vertical longitudinal, horizontal and transverse sections of a slightly varied construction, Fig. 20 being a section on the line 20—20 of Fig. 19.

Referring to the embodiment of the invention illustrated, A is the train-pipe carrying the supply of steam to the several cars. It is provided beneath the floor B of the car with a pair of branches C, one running to each side of the car, and each connected by a vertical branch D passing through the floor of the car, and a horizontal branch E with the radiator F. A hand-operated stop-valve G is arranged within the car for use when the supply of steam is to be cut off entirely from the radiator. In the horizontal branch C below the floor of the car is an automatic admission valve indicated as a whole by the letter H. This valve may be automatically controlled by thermostatic mechanism in a casing J, in which also is the discharge valve to which the discharging steam and water of condensation are led through the inclined branch K within the car, the vertical branch L passing through the floor of the car and the inclined branch M beneath the car. The controlling mechanism in the casing J is manipulated by means of a vertical shaft N passing upward through the floor of the car, and provided within the car with a handle N' by which it can be turned about 180 degrees. The handle N' for example may be located near or set down into the floor of the car and surrounded by a ring $N^2$, the handle carrying a pointer and the ring carrying marks to indicate the desired positions such, for example, as "Pressure", "Blow-off" and "Vapor". When the handle is turned in one position the system operates under pressure. When turned in the opposite position the system operates as a vapor system. In the intermediate position the system is blown out by the holding of both the admission and the discharge valves open.

Within the casing J of the regulating apparatus is a thermostat comprising, in this case, a vessel O of sheet metal carrying ether or other highly volatile liquid adapted to be vaporized and to expand the walls of the vessel when a sufficient temperature is applied thereto. The discharge valve P closes against a seat Q which is fastened in one end of the casing J, and which is fastened also to the discharge pipe M of the radiator. The discharge valve P is provided with an extension R adapted to be engaged by one of the flat walls of the thermostat and to transmit the outward movement of said wall to the valve. The valve tends normally to assume an open position under the expansion of a helicoidal spring S. The admission valve proper T is provided with a similar helicoidal spring U tending to hold the valve normally open. A stem V of the valve extends into the casing J and is provided there with a head W adapted to engage the opposite flat face of the thermostat and to transmit the motion thereof to the valve. The stem V of the admission valve passes through the head of the valve casing, to which is connected by four tappet screws or in any other suitable way, a ring X having a spider or a set of arms Y connected with the casing J, so that the casing J of the regulating apparatus, the admission valve and its seat, and the discharge valve and its seat, are held together in a unitary structure which can be readily applied upon existing systems by merely intercalating the admission valve in the horizontal admission branch, and connecting the discharge pipe of the system with the opposite end of the casing J.

The conversion of the system from a pressure system to a vapor system or vice versa is effected by means of the vertical shaft N, the turning of which in one direction forces the member R against the corresponding face of the thermostat and holds it there (Fig. 4), while leaving the member W and the admission valve free to move under the expansion of the thermostat. The turning of the shaft in the opposite direction holds the part W fixed (Fig. 3) and leaves the part R free. In the first case the discharge valve is held fixedly open and the admission valve is opened or closed by the expansion or contraction of the thermostat so as to regulate the quantity of steam admitted and, supposing the thermostatic liquid to be vaporized as soon as any steam passes through the discharge port, converting the system into one in which the quantity of steam admitted is limited to only such a quantity as will be condensed in the radiator and discharge pipes. In the second position (Fig. 3) the admission valve is held fixedly open and the discharge valve is free, so that the system is converted into an ordinary pressure system in which when the steam escapes at the discharge there is an expansion of the thermostat and a closing of the discharge valve for a sufficient length of time to permit the accumulation of a small quantity of water of condensation, whereupon the cooling of the thermostat permits the discharge valve to reopen and discharge the water of condensation, which is followed by steam which closes the valve again as before. The movements above described are transmitted from the reversing shaft N by means of an eccentric Z carried on the lower end thereof within the casing. This eccentric actuates the head W of the admission valve spindle V directly, being arranged in a vertical opening through said head, and which opening is of a width slightly greater than the diameter of the eccentric. Thus when the eccentric is in the position of Fig. 3 it holds the admission valve wide open. When the eccentric is in the opposite position (Fig. 4) the admission valve is released, and by reason of the play between the eccentric and the opening in the head W, the admission valve may be closed by the expansion of the thermostat. The discharge valve is controlled by similarly holding or releasing its head R. For this purpose an oblong ring $a$ is arranged in a plane transverse to that of the thermostatic vessel O and surrounding the latter, and transmits the movement of the eccentric to the head R of the exhaust valve. At points in line with the axis of the thermostat the ring $a$ is divided so as to form smaller rings, $b$, $c$, at the opposite sides respectively, and which smaller rings are parallel with the thermostat. The ring $b$ surrounds a flange on the head R of the discharge valve, so that when the ring $a$ is shifted to the left it holds this head R stationary. The ring $c$ passes about the head W and is provided with slots above and below the head W and in which the eccentric Z fits (Fig. 12). Now when the eccentrics are in the position of Fig. 3, besides holding the admission valve fixedly open, they release the head R from control by the ring $a$; and in the position of Fig. 4 the ring $a$ is shifted to the left to bring the ring $b$ against the flange of the head R so as to hold the discharge valve fixedly open, the admission valve being freed as previously explained. The horizontal ring $a$ is supported at opposite sides upon lugs $e$ on the side walls of the casing J.

For the purpose of rendering the operation of the trap more readily responsive to the conditions of the outside atmosphere, so that it will contract promptly after having been expanded to cut off the steam, the casing is arranged to induce a current of air in contact with the thermostatic vessel. The arrangement of the parts is similar to that shown in my Patent No. 507,268 of October 24, 1893; and others, relating to thermostatic steam traps. The discharge of the water of condensation and any escaping steam is by way of the valve P; whence the steam is conducted to the face of the thermostatic vessel and the water runs off through an opening $f$ in the bottom of the casing. This same opening admits air for ventilation or quick cooling of the thermostat. The top and bottom of the casing are provided with lugs $g$ which serve to hold the thermostat against displacement in a vertical plane. The bottom $h$ of the casing is hinged at one side and provided with a link and eccentric lock $j$ at the opposite side, so that the casing may be readily opened for introduction and removal of the several parts. The inside line of the bottom $h$ is shown in Figs. 3 and 4 passing between the opening $f$ and the support for the foot of the reversing shaft N. The air which enters the opening $f$ passes out at the upper part of the back of the casing through an opening $k$ which is covered by a hood $l$ containing a thin wire screen $k^2$ as in Figs. 12, 13, 18 and 20, the construction being similar to that employed in the well known Gold ventilating trap.

The construction described is of advantage in that the complete apparatus is arranged horizontally under the floor of the car so as to take very little vertical space, and so as to arrange the automatic admission valve on its side, and to prevent the existence of pockets such as exist when the valve is arranged with its stem vertical, which pockets catch a certain amount of water in a place where it is liable to freeze and interfere with the correct operation of the system. By arranging the valve horizontally as shown, such pockets are avoided, and by giving to the valve and to the horizontal branch C in which it is located, a slight pitch toward the train-pipe; all water of condensation flows back into the train-pipe, and the pocketing and freezing of this water is avoided. Preferably also the discharge valve end of the regulating apparatus is pitched a little lower than the admission valve end, so as to permit the apparatus to be placed as close up under the car as possible, the casing of the regulating mechanism being larger than the casing of the admission valve.

The apparatus is capable of conversion into a simple vapor system by a slight change which causes the discharge valve to remain always open, as for example, by simply taking out the packing of the discharge valve P as shown in Fig. 6, so that in all positions the discharge would take place freely through the seat Q. Or the valve P might be substituted by a simple plate P', Fig. 7, in place of the discharge valve, the plate P' being of less thickness so that it cannot cover the discharge opening through the seat Q, but serves to hold the back of the expansible vessel O so as to cause the operation of the admission valve as previously described. Various other devices may be adopted for providing a backing for the expansible vessel without effecting a closure of the discharge opening when the device is released. These constructions provide not only for the operation of the system automatically as a vapor system when the eccentric is in the position of Fig. 6, but also for the free passage of steam through the system to blow it off by turning the eccentric to the opposite position. This capability of blowing out the vapor system is very useful, for example, where a train is carried on a siding and stands there for a considerable time. The maintaining of the admission valve open causes the full pressure of the steam from the train-pipe to blow through the radiator in the car so as to blow out all the water therein, and to avoid freezing when the car is subsequently detached from the source of steam. It is important in utilizing parts of the apparatus in this way to retain the head R or some other suitable means for limiting the expansion of the expansible vessel, because without such a limiting means the side of the vessel might be pressed out so far as to prevent its return to its original position upon subsequent cooling. The automatic admission valve and its connections to the regulating apparatus may also be omitted or neutralized and important features of the invention retained in its control of the discharge valve and its capability of use for blowing off the system. In this case the head W or some other suitable means for limiting the expansion of the thermostatic vessel, should be provided. The system might then be operated as a pressure system. Fig. 9 shows this adaptation by the removal from the valve proper T of the packing, shown at T' in Fig. 6, so that there can be no closure of the admission valve. With the admission valve constantly open in this way the system may be operated as an ordinary pressure system. The turning of the eccentric to the position of Fig. 9 would hold the discharge valve permanently open and permit the steam to flow freely through the system so as to blow it out thoroughly. The turning of the eccentric to the opposite position would result in the operation of the mechanism as an automatic steam trap, the discharge valve opening to permit the escape of water of condensation when the thermostat cools and the thermostat expanding as soon as the steam commences to escape and reclosing the valve. As compared with the ordinary construction using a separate blow-off valve in addition to the automatic discharge trap, this mechanism cuts out one valve with the cost of its maintenance in good repair.

Instead of cutting out the packing from the regular admission valve T, various other means may be employed for rendering this valve inoperative. For example, as shown in Fig. 10, a dummy or ring T² may be fastened on the valve stem and may be of such slight thickness as to leave the valve open in all positions of the stem.

Figs. 8 and 11 indicate the manner of control of the apparatus shown in Figs. 6 and 9 respectively. The handle N', like that shown in Fig. 2, may be fixed or removable on the squared head of the shaft N, and the shaft carries an arrow which points to the proper position marked on the ring N². In Fig. 8 there are only two important positions of the arrow, one for opening the blow-off and the other for causing the system to operate with vapor. In Fig. 11 there are ony two important positions, one for blowing off the system and the other for causing it to operate under pressure. In Fig. 2, however, the pressure and vapor positions are opposite each other and the intermediate position, for the blow-off, is marked. By designing the valves and the eccentric and the intermediate parts so as to allow a free passage through both valves in the intermediate position of the eccentric, the necessity of the ordinary blow-off is avoided. When the arrow points to this intermediate position the eccentric is in one of its halfway positions, and both valves are held open slightly but rigidly, notwithstanding the tendency of the thermostat to expand. The steam from the source of supply flows under supply-pipe pressure through the system to secure the desired clearing out.

It is proposed to provide dummies P' T² for replacement of the discharge valve and the admission valve proper with each apparatus, so that it can, in accordance with the wish of the railroad, be installed as a simple pressure system or as a simple vapor system. Substitute index rings of the sorts shown in Figs. 8 and 11 may also be provided. However, if they are not provided the ring of Fig. 2 may be used. If the system is made permanently into a pressure system it is only necessary to turn the pointer to "Pressure" when heat is desired and to any other point substantially distant from "Pressure" when a blow-off is desired. Similarly, if the system is arranged to act permanently as a vapor system it is only necessary to turn the pointer to "Vapor" or to some other substantially distant point of the scale, in accordance with the operation desired.

Instead of an automatic trap a drip arrangement may be used which provides an opening so small as to permit the discharge of water of condensation at the same rate that it accumulates, and without the loss of any quantity of steam. Fig. 13 shows such a construction. Here instead of the valve P of the previous figures there is substituted a valve P² provided with a small groove $m$ through which the water of condensation can escape at about the same rate that it accumulates. The valve P² is preferably connected rigidly with the oblong ring $a$ by which the action is transmitted from the eccentric Z to the dicharge side of the expansible vessel, the ring $c$ which is directly engaged by the eccentric being a part of the oblong ring $a$.

When the system has been operated under pressure and the heat is cut off by the admission stop valve, the condensation of the steam in the pipes causes a vacuum which draws up or holds up water in the pipes to a certain extent and introduces a liability of freezing. To prevent this by immediately breaking any vacuum which may be formed for this purpose, I prefer to use a gravity operated trap of the style shown in my Patent, No. 522,253, July 3, 1894. Arrangements of such a trap are shown in Figs. 3 and 14 respectively. The trap comprises a valve $n$ having a stem $o$ at the end of which is a weight $p$ designed to tilt the valve and thus form an opening between the valve and its seat so as to let in air and break the vacuum. When there is a pressure within the pipe the valve $n$ is held flat against its seat. When the pressure falls to one or two pounds or less the weight tilts the valve and admits air. In order to avoid the escape of any material quantity of steam through this gravity trap when the system is working as a vapor system (and there is no pressure in the pipes) so that a sufficient quantity of discharging steam shall pass through the thermostat O, a guard is provided such as the pocket $q$ of Fig. 3 or the inclined wall $r$ of Fig. 14, which prevents the steam from flowing toward the gravity trap. As there is no substantial back pressure upon the steam it will not flow in any material quantity through the gravity trap; but as soon as the discharge valve is closed and the system operated under pressure a back presure of steam will close the gravity trap.

The term "steam" is used herein to indicate not only pure steam, but mixtures such as steam and air which are sometimes circulated in heating systems. The invention is applicable not only to systems in which the heat is radiated directly from the steam pipes into the atmosphere of the car or other apartment, but also to systems employing other means of radiation such, for example, as the indirect system in which the steam is used to heat water which is circulated, and the heat from which is directly radiated into the atmosphere. The term "radiating system" or "radiator" is used herein to apply either to the system radiating heat of the steam directly into the atmosphere, or to the system radiating the heat of the steam indirectly, through water, into the atmosphere.

Fig. 15, for example, shows an embodiment of the invention comprising all of the several features hereinabove enumerated. The mechanism beneath the floor of the car, the train-pipe A, branch C, automatic admission valve H, discharge pipe M, thermostatic mechanism within the casing J, and gravity trap indicated as a whole by the letter $s$, are the same as in Fig. 1. The vertical branch D of the admission pipe passing through the floor of the car leads through the hand stop valve G to a double coil $t$ and thence through the branches K, L and M to the discharge. Water is circulated through any style of radiator by means of the pipes $u$ and $v$, the water passing through the outer pipe of the double coil $t$ while the steam passes through the inner pipe of the same coil; and the water passing thence through a pipe $w$, reservoir $x$ and pipe $y$ to the radiator pipe $u$. At preferably the lowest point of the piping leading from the automatic admission valve up into the car, as at the bottom of the vertical pipe D, there is located a second gravity trap $s'$ which serves to empty water from the portion of the piping between the automatic admission valve H and the stop valve G, this gravity trap being adjusted to remain closed under even the very slight pressure in which the steam passes through the automatic admission valve when the system is worked as a vapor system. Of course a certain amount of pressure at the admission pipe is necessary to force the steam through the pipes even when the discharge end is open, as in working under a vapor system. The adjusting shaft N is preferably provided with a handle $N^3$ under the floor of the car and, adjacent to the casing J either as a substitute for the inside handle N' or for use in connection therewith. This handle may be set before the train starts so as to determine for the entire run the manner in which the system shall operate.

When the system is operated under pressure this pressure will ordinarily be that in the train-pipe. The train-pipe pressure fluctuates considerably, however, and a lower and more uniform pressure may be desired. In that case a pressure reducer may be inserted at any suitable point in the admission pipe which supplies steam to the radiator, so that this supply pipe pressure will be of the desired degree and uniformity. The term "supply pipe pressure" is used herein to refer to the pressure secured by such a pressure reducer, or to the train-pipe pressure when no such pressure reducer is used. Such a pressure-reducing valve is shown, for example, at $z$ in Fig. 15 and may be adjusted to any desired pressure within the range permitted by the pressure in the train-pipe. This feature of construction is not claimed herein, being claimed in my previous application, No. 455,470.

The thermostat of Fig. 15 is slightly different from that of the previous figures; involving a separation of the heat-receiving and the expanding functions respectively so that each is accomplished more efficiently. Suitable mechanism of this character is shown in the vertical sectional views, Figs. 16 and 17, either of which may be a section through the casing J of Fig. 15. The thermostatic device is of a character similar to that shown in several of my prior applications for patent, (No. 455,470, filed September 30, 1908, and others). It comprises (according to Fig. 15) a vessel O' substantially the same as the vessel O of Fig. 12, except that it does not necessarily contain any substantial quantity of thermostatic liquid, and a coil 10 communicating by a pipe 11 with the lower part of the expanding vessel O'. The coil 10 is a spiral surrounding a core 12 comprising a pipe with openings therethrough for the heat escaping from the system to gain access to the inner cylindrical face of the thermostatic coil. The supporting core 12 of the coil is preferably a continuation of the pipe 13 through which the discharging heating medium passes. The coil may of course be mounted in various ways to provide access for the discharging heating medium thereto. At the same time it is exposed to the atmosphere very freely, is extremely sensitive and is readily applied to existing systems, and has numerous other advantages referred to in detail in my aforesaid prior applications. With this mechanism the ventilating arrangements for the mechanism within the casing J are not essential. A sufficient action of the cold air is secured by the exposure of the coil 10. The ventilating opening $k$ and hood $l$ may therefore be retained as in the figure, or omitted. The other parts of the apparatus are the same as in Fig. 12 and need not be referred to again in detail.

Fig. 17 shows a further variation in the construction of the thermostatic means. Instead of a single expansible vessel, two of such vessels, $O^2$ and $O^3$ are employed connected to each other by a tube 14 which in turn is connected to the tube 11 leading to the coil 10 carrying the thermostatic liquid and exposed within to the heating medium and without to the air. Thus the parts $O^2$, $O^3$ and 10 are parts of a single thermostat. The arrangement serves to provide a fixed upper end for the tube 11. The inner faces of the expansible vessels $O^2$ and $O^3$ bear against a fixed support such as a cross piece 15 extending between the side walls of the casing and fitting closely between the two expanding vessels. The other parts of the apparatus are the same in construction and operation as for Fig. 16. The oblong ring $a'$ which connects the rings $b$ and $c$ for transmitting the motion of the eccentric to the discharge valve, is of course elongated because of the greater distance between the parts $b$ and $c$. With the parts in the position of Fig. 17, for vapor operation the vessel $O^3$ is held fast and all the expansion takes place in the vessel $O^2$, thus actuating the admission valve. With the eccentric turned in the opposite position the admission valve would be held open and the expansible vessel $O^2$ held fast while the vessel $O^3$ would be permitted to expand to actuate the discharge valve. The two vessels $O^2$ and $O^3$ arranged as in Fig. 17, may also be used as a substitute for the single vessel $O$ of Fig. 12 without the common coil 10, the thermostatic liquid being carried directly in the expansible vessels.

In Figs. 18, 19 and 20, I show a construction which presents improvements in detail over the constructions described in the previous figures. These figures represent the preferred form of the invention in so far as the details in question are concerned, and the improvements in these details may generally be applied to any of the constructions shown in the previous figures. The improvements are shown in connection with a mechanism of the same type as in Figs. 3 and 4. The throw of the eccentric is slightly increased in order to give larger openings of the valves. The casing J is provided with two ventilating openings $k'$ at the sides instead of the one at the back shown in the other designs. The adjusting shaft $N^4$ terminates at its upper end in a socket 16, into which the shaft N of the previous figures running up into the car may have a lower squared end inserted. Instead of locating the outside handle $N^3$ of this shaft upon the top of the casing, a smaller handle $N^5$ may be provided on the lower end of the shaft $N^4$. This handle is also used to provide an impositive stop for the shaft in each of its three positions by means of the spring-pressed button $N^6$ projecting from the upper face of the handle or arm $N^5$, and adapted to click into the depressions $N^7$ which are formed in the under face of the casing J at the two extreme positions and the intermediate position of the shaft. By this means the operator within the car can feel when the shaft is set accurately for the desired operation. A further improvement is the provision upon each of the side portions of the oblong ring $a$ of a long bearing 17. Pins 18 pass through the bearing portions 17 of the oblong ring and serve as guides therefor. The discharge valve $P^3$ is attached to its seat $Q^1$ by means of a pin 19, allowing the necessary play between the valve and its seat, the seat having a spider, through the hub of which the pin 19 passes. The spring $S'$ for forcing the valve away from its seat is located about the pin 19. This construction insures the holding of the valve in place when the thermostat is removed for any purpose.

The pipes depending below the casing J in Figs. 16 and 17 have, besides the functions previously described, an advantage in that they convey the discharging steam to a point considerably below the floor of the car, and insure a certain amount of condensation before discharging it into the surrounding atmosphere. This is important in order to prevent, as far as possible, the steam from injuring the paint or varnish on the car. When a considerable volume of steam is emitted, as in blowing out the pipes for example, the hot moisture frequently damages the paint or varnish, and this is especially the case where it is discharged close up under the floor of the car, whence it travels sidewise and upward along the varnished side of the car. Such pipes may therefore be advantageously used without the coil. An example of this construction is shown in Fig. 18, where a sheet metal pipe 20, preferably flared at its lower end, is riveted upon a thimble 21 screwed into the bottom of the casing. In the construction of these figures also there is shown a convenient mode of attaching the pressure trap $s$ by mounting it in a short fitting or length of pipe $M'$ which is bolted upon the discharge end of the casing and is connected to the discharge pipe M.

What I claim is:

1. A steam heating system including in combination radiating pipes, an admission valve, a discharge valve, a thermostat exposed to the heat of the heating medium after it has passed through said radiating pipes and arranged to exert a closing pressure in opposite directions simultaneously upon the respective valves, and means for alternatively preventing closing movement of said valves.

2. A steam heating system including in combination radiating pipes, an admission valve, a discharge valve, and a thermostat exposed to the heat of the heating medium after it has passed through said radiating pipes and arranged to act on one of said valves and to react against the other simultaneously, and means for alternately holding said valves open in position to form reaction abutments for said thermostat.

3. A steam heating system including in combination radiating pipes, an admission valve, a discharge valve, and a thermostat bearing against said valves and exposed to the heat of the heating medium after it has passed through said radiating pipes, and mechanism for alternatively providing different reaction abutments for said thermostat and causing it to act alternatively on said valves.

4. A steam heating system including in combination radiating pipes, an admission valve, a discharge valve, and a thermostat exposed to the heat of the heating medium after it has passed through said radiating pipes, said valves being normally held open and pressed against opposite sides of said thermostat, and means for holding one of said valves in its said normal position and leaving the other free to receive the expansive movement of the thermostat.

5. A steam heating system including in combination a discharge trap consisting of a normally open discharge valve and a thermostat for closing said valve, an admission valve, means for holding said discharge valve open and thereby preventing movement of the thermostat in a direction to close said discharge valve, and means for causing a transmission of the movement of the thermostat in another direction to the admission valve when the discharge valve is held open.

6. A steam heating system including in combination a radiator, a thermostatic vessel free to expand in opposite directions and having opposite sides adapted to expand outward, and means for providing abutments alternatively upon the opposite side faces of said vessel so as to cause the entire expansion to take place in the opposite direction, and means for utilizing such expansion alternatively for controlling the admission and the discharge of the heating agent to and from the radiator.

7. A steam heating system including a thermostatic vessel O, a discharge valve having a head R at one side of said vessel, an admission valve having a head W at the opposite side of said vessel, a ring $a$ surrounding said vessel and having a portion adapted to engage said head R, a reversing rod N and means carried thereby for shifting said ring to release the head R and at the same time holding the head W fixedly in place against the vessel and for releasing the head W and shifting the ring $a$ to hold the head R fixedly against the vessel.

8. A steam heating system including an admission valve, a discharge valve, means for holding either of said valves open at will, automatic means for causing the other to act under the influence of steam adjacent to the discharge end of the system, a trap in said system held closed by a slight pressure, and a deflector positioned adjacent to the outlet of the trap and arranged to deflect the steam past said trap in its passage to the discharge valve, and permitting the escape of steam or water when the discharge valve is closed.

9. A steam heating system including radiating pipes, an admission valve, a discharge valve, means for causing said valves to open and close automatically and adjusting means for holding either of said valves open at will, said discharge valve being removable and replaceable by a dummy to cause the discharge to remain always open.

10. A steam heating system including radiating pipes, an admission valve, a discharge valve, means for causing said valves to open and close automatically and adjusting means for holding either of said valves open at will, said admission valve being removable and replaceable by a dummy to cause the admission to remain always open.

In witness whereof, I have hereunto signed my name in the presence of two subscribing witnesses.

EDWARD E. GOLD.

Witnesses:
D. ANTHONY USINA,
FRED WHITE.